United States Patent
Tibben et al.

(10) Patent No.: US 9,958,085 B2
(45) Date of Patent: May 1, 2018

(54) FLOW CONTROL VALVE HAVING A MOTION CONVERSION DEVICE

(71) Applicant: FISHER CONTROLS INTERNATIONAL LLC, Marshalltown, IA (US)

(72) Inventors: Bradley Steve Tibben, Nevada, IA (US); Ross Arthur Schade, Ames, IA (US); Elliot James Hoff, Ames, IA (US)

(73) Assignee: FISHER CONTROLS INTERNATIONAL LLC, Marshalltown, IA (US)

( * ) Notice: Subject to any disclaimer, the term of this patent is extended or adjusted under 35 U.S.C. 154(b) by 0 days. days.

(21) Appl. No.: 14/546,724

(22) Filed: Nov. 18, 2014

(65) Prior Publication Data
US 2016/0123492 A1 May 5, 2016

Related U.S. Application Data (60) Provisional application No. 62/073,775, filed on Oct. 31, 2014.

(51) Int. Cl.
| | |
|---|---|
| *F16K 31/12* | (2006.01) |
| *F16K 31/122* | (2006.01) |
| *F16K 3/24* | (2006.01) |
| *F16K 31/163* | (2006.01) |
| *F15B 7/00* | (2006.01) |

(52) U.S. Cl.
CPC ............ *F16K 31/1225* (2013.01); *F15B 7/00* (2013.01); *F16K 3/24* (2013.01); *F16K 31/163* (2013.01)

(58) Field of Classification Search
CPC ...... F16K 31/163; F16K 31/1225; F16K 3/24; F15B 7/00

USPC .............................................. 137/86; 251/57
See application file for complete search history.

(56) References Cited

U.S. PATENT DOCUMENTS

| | | | | |
|---|---|---|---|---|
| 3,838,710 A | * | 10/1974 | Reip ................... | F15B 13/0431 137/596.15 |
| 4,255,930 A | * | 3/1981 | Natalie ..................... | F15B 7/00 60/546 |
| 2009/0272929 A1 | | 11/2009 | Bey et al. | |

FOREIGN PATENT DOCUMENTS

GB          2049824 A          12/1980

OTHER PUBLICATIONS

International Search Report for International Application No. PCT/US2015/058183, dated Feb. 2, 2016.

(Continued)

*Primary Examiner* — Umashankar Venkatesan
(74) *Attorney, Agent, or Firm* — Marshall, Gerstein & Borun LLP (57) ABSTRACT

A motion conversion device including a body, a first double-acting cylinder movable along a first axis and a second double-acting cylinder movable along a second axis angled relative to the first axis. The body includes several bores which form a closed circuit and house the first and second double-acting cylinders. Movement of the first double-acting cylinder along the first axis hydraulically or pneumatically pushes the second double-acting cylinder along the second axis. Also disclosed is a valve incorporating a motion conversion device with angled double-acting cylinders for moving a closure member between an open position and a closed position, and a method for opening and closing a valve by way of angled double-acting cylinders.

13 Claims, 6 Drawing Sheets

(56) References Cited

OTHER PUBLICATIONS

Written Opinion of the International Searching Authority for International Application No. PCT/US2015/058183, dated Feb. 2, 2016.

* cited by examiner

FLOW CONTROL VALVE HAVING A MOTION CONVERSION DEVICE

This application claims the benefit of the filing date of U.S. Provisional Application No. 62/073,775, filed on Oct. 31, 2014. U.S. Provisional Application No. 62/073,775 is hereby incorporated by reference in its entirety.

FIELD OF DISCLOSURE

The present disclosure relates to a motion conversion device for use on flow control valves and including double-acting cylinders movable along different axes. The present disclosure also relates to a flow control valve including a motion conversion device to move a closure member between an open and closed position, and to a method for opening and closing a valve.

BACKGROUND

Commercial and industrial processes use a system of control valves to control the flow of a process fluid through a process plant. Many process control valves, including threaded internal valves, regulators, or other control devices, require actuators to position a flow control element inside the valve in a desired position. The control element, in turn, controls the flow of a process fluid through the valve. In many applications, the actuator is mounted directly to the valve body and connects to a valve stem, and the valve stem is operatively coupled to the flow control element. Depending on the type of valve, the valve actuator either rotates the valve stem or moves the valve stem in a linear direction.

In various applications, valve designers may desire to convert one type of motion into another type of motion. For example, some applications require the conversion of translational movement in one direction into translational movement in another direction. An example of one such application is an axial flow valve which requires movement generated by power source external to a flow passage to be converted into axial movement of a component inside the flow passage. Still other examples are known in the art.

Figure 1:
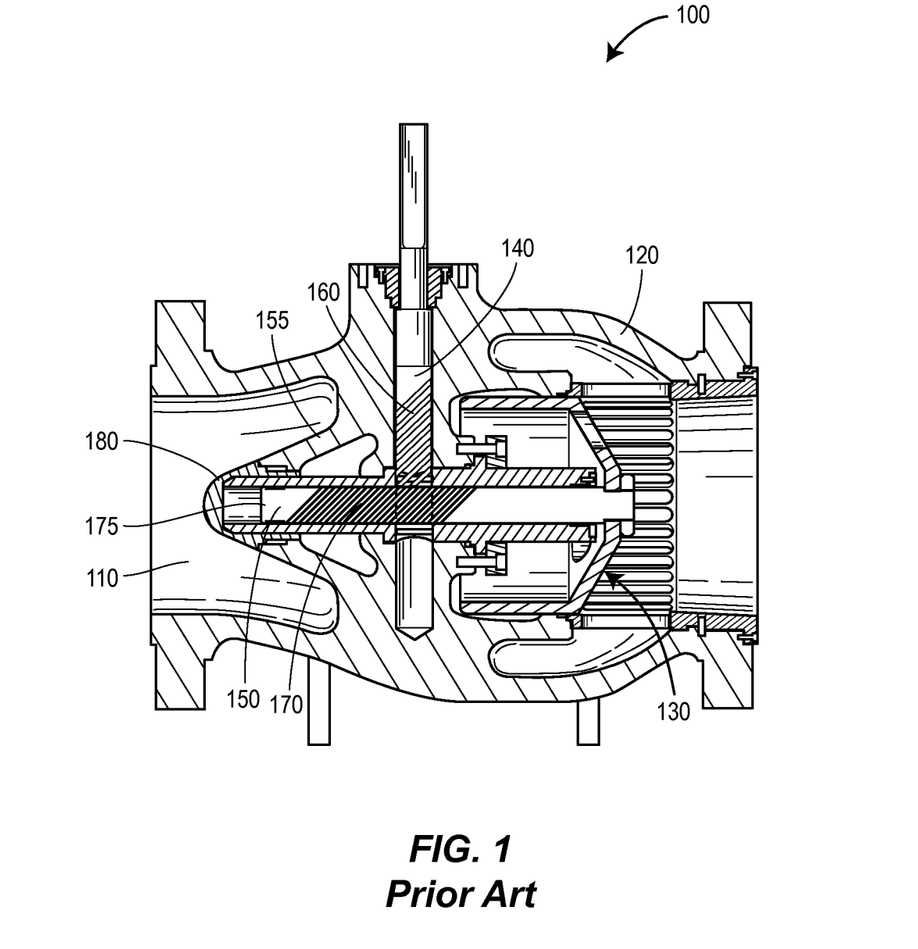
FIG. 1 depicts a cross-sectional view of a known axial flow valve 100 incorporating a drive rack 140.

FIG. 1 illustrates an example of a known axial flow valve 100. The axial flow valve 100 includes a flow passage 110 extending through a valve body 120. A closure member 130 is positioned inside the flow passage 110 to selectively open and close the flow passage 110. The closure member 130 is movable along a central axis of the flow passage 110 between a closed position preventing fluid flow through the flow passage 110 and an open position permitting fluid flow through the flow passage 110. Axial movement of the closure member 130 is provided by the interaction of a drive linear rack 140 and a driven linear rack 150 located within the flow passage 110. A housing 154 protects the drive rack 140 and the driven linear rack 150 from the fluid flowing through the flow passage 110. The drive rack 140 is moved by a linear actuator (not shown) external to flow passage 110. Gear teeth 160 of the drive rack 140 meshingly engages gear teeth 170 of the driven linear rack 150. Linear motion of the drive rack 140 causes the driven linear rack 150 to move along the axial direction.

Positioning the closure member 130 in the open position of FIG. 1 requires moving a rear end 175 of the driven linear rack 150 away from the drive rack 140. An enlarged rear end 180 of the housing 155 is needed to accommodate the rear end 175 of the driven linear rack 150 in this position. The enlarged rear end 180 of the housing 155 impacts the fluid flow in the flow passage 110 and also increases the costs and complexity of manufacturing the housing 155 and/or the valve body 120. Another consequence of the arrangement shown in FIG. 1 is that axial motion is lost to the racks 160, 170, and the friction created in this arrangement causes a need for larger linear actuators. As such, the lengths of the racks 140, 150 are extended in order to achieve the desired travel distance of the closure member 130. This further increases the size of the housing 155 and the valve body 120.

SUMMARY

In accordance with a first exemplary aspect, a valve body includes a flow passage, and a closure member is movable between a closed position preventing fluid flow through the flow passage and an open position permitting fluid flow through the flow passage. The valve body includes a first bore, a second bore and a third bore forming a closed circuit arranged to receive a fluid. A first double-acting cylinder is positioned in the first bore and is movable along the first axis, and a second double-acting cylinder is positioned in the second bore and is movable along the second axis, the second double-acting cylinder operatively connected to the closure member. The first and second axes are angled relative to one another. The closed fluid circuit is arranged such that movement of the first double-acting cylinder along the first axis causes movement of the second double-acting cylinder along the second axis, thereby causing movement of the closure member between the closed position and the open position.

In accordance with a second exemplary aspect, a motion conversion device for use with a control valve includes a body including a first bore, a second bore and a third bore forming a closed fluid circuit arranged to receive a fluid. A first double-acting cylinder is movable within the first bore along a first axis, and a second double-acting cylinder is movable within the second bore along a second axis, with the first axis being angled relative to the second axis. An actuator is configured to move the first double-acting cylinder along the first axis to hydraulically or pneumatically push the second double-acting cylinder along the second axis, and the bores and cylinders of the closed fluid circuit arranged such that movement of the first double-acting cylinder along the first axis causes movement of the second double-acting cylinder along the second axis.

In accordance with a third exemplary aspect, a method for opening and closing a valve includes providing a valve having a flow passage and a closure member, providing a closed fluid circuit having a first bore and a second bore, the first and second bores angled with respect to one another, positioning a first double-acting cylinder in the first bore, and positioning a second double-acting cylinder positioned in the second bore. The method includes operatively connecting second double-acting cylinder to the closure member, and moving the first double-acting cylinder under fluid pressure in one direction along a first axis to push the second double-acting cylinder in a first direction along a second axis, thereby moving the closure member in the first direction along the second axis, and moving the first double-acting cylinder under fluid pressure in another direction along the first axis to push the second double-acting cylinder in a second direction opposite the first direction, thereby moving the closure member in the second direction along the second axis.

In further accordance with any one or more of the foregoing first, second or third aspects, a valve, a motion conversion device and/or a method may further include any one or more of the following preferred forms.

In one preferred form, the valve may include a first double-acting cylinder including a first rod and a first piston, with the first rod extending through a closed end of the first bore and the first piston sealingly and slidably engaging a circumferential surface of the first bore. The second double-acting cylinder may include a second rod and a second piston, with the second rod extending through a closed end of the second bore and connecting to the closure member and the second piston sealingly and slidably engaging a circumferential surface of the second bore.

In another preferred form, the first end surface of the first piston may be configured to push a liquid or gas through the first and second bores toward a first end surface of the second piston to move the second double-acting cylinder away from the first bore and thereby move the closure member into the closed position. A second end surface of the first piston may be configured to push a liquid or gas through the first, second and third bores toward a second end surface of the second piston to move the second double-acting cylinder toward the first bore and thereby move the closure member into the open position.

In another preferred form, a first end of the third bore may open into a portion of the first bore bounded by the first piston and the closed end of the first bore, and a second end of the third bore may open into a portion of the second bore bounded by the second piston and the closed end of the second bore.

In another preferred form, the valve may include a first O-ring positioned in a first annular groove in the first piston to sealingly engage the first piston and the circumferential surface of the first bore. The valve may include a second O-ring positioned in a second annular groove in the second piston to sealingly engage the second piston and the circumferential surface of the second bore.

In another preferred form, a diameter of the first head may be equal to a diameter of the second head.

In another preferred form, a distance traveled by the first double-acting cylinder along the first axis may be equal to a distance traveled by the second double-acting cylinder along the second axis so that a ratio of movement between the first and second double-acting cylinders is 1:1.

In another preferred form, the valve may include an actuator configured to move the first double-acting cylinder back-and-forth along the first axis.

In another preferred form, the valve may include a housing positioned in the flow passage so that a liquid or gas in the flow passage flows around the housing. The first, second and third bore may be enclosed within the housing.

In another preferred form, the second bore may be coaxial with the flow passage.

In another preferred form, the first double-acting cylinder may include a first rod and a second piston, with the first rod extending through a closed end of the first bore and connecting to the actuator and the first piston sealingly and slidably engaging a circumferential surface of the first bore. The second double-acting cylinder may include a second rod and a second piston, with the second rod extending through a closed end of the second bore and the second piston sealingly and slidably engaging a circumferential surface of the second bore.

In another preferred form, a first end surface of the first piston may be configured to push a liquid or gas through the first and second bores toward a first end surface of the second piston to move the second double-acting cylinder away from the first bore. A second end surface of the first piston may be configured to push a liquid or gas through the first, second and third bores toward a second end surface of the second piston to move the second double-acting cylinder toward the first bore.

In another preferred form, a first end of the third bore may open into a portion of the first bore bounded by the first piston and the closed end of the first bore, and a second end of the third bore may open into a portion of the second bore bounded by the second piston and the closed end of the second bore.

In another preferred form, a diameter of the first piston may be equal to a diameter of the second piston.

In another preferred form, a distance traveled by the first double-acting cylinder along the first axis may be equal to a distance traveled by the second double-acting cylinder along the second axis so that a ratio of movement between the first and second double-acting cylinders is 1:1.

In another preferred form, the first axis may be orthogonal to the second axis.

In another preferred form, the valve may include a third bore providing fluid communication between the first bore and the second bore, and the first, second and third bores may form a closed circuit.

In another preferred form, a diameter of the first piston is different from a diameter of the second piston so that a distance traveled by the first double-acting cylinder along the first axis is different from a distance traveled by the second double-acting cylinder along the second axis and a ratio of movement between the first and second double-acting cylinders is inverse to a ratio of the diameters of the first and second pistons.

DETAILED DESCRIPTION

Figure 2A:
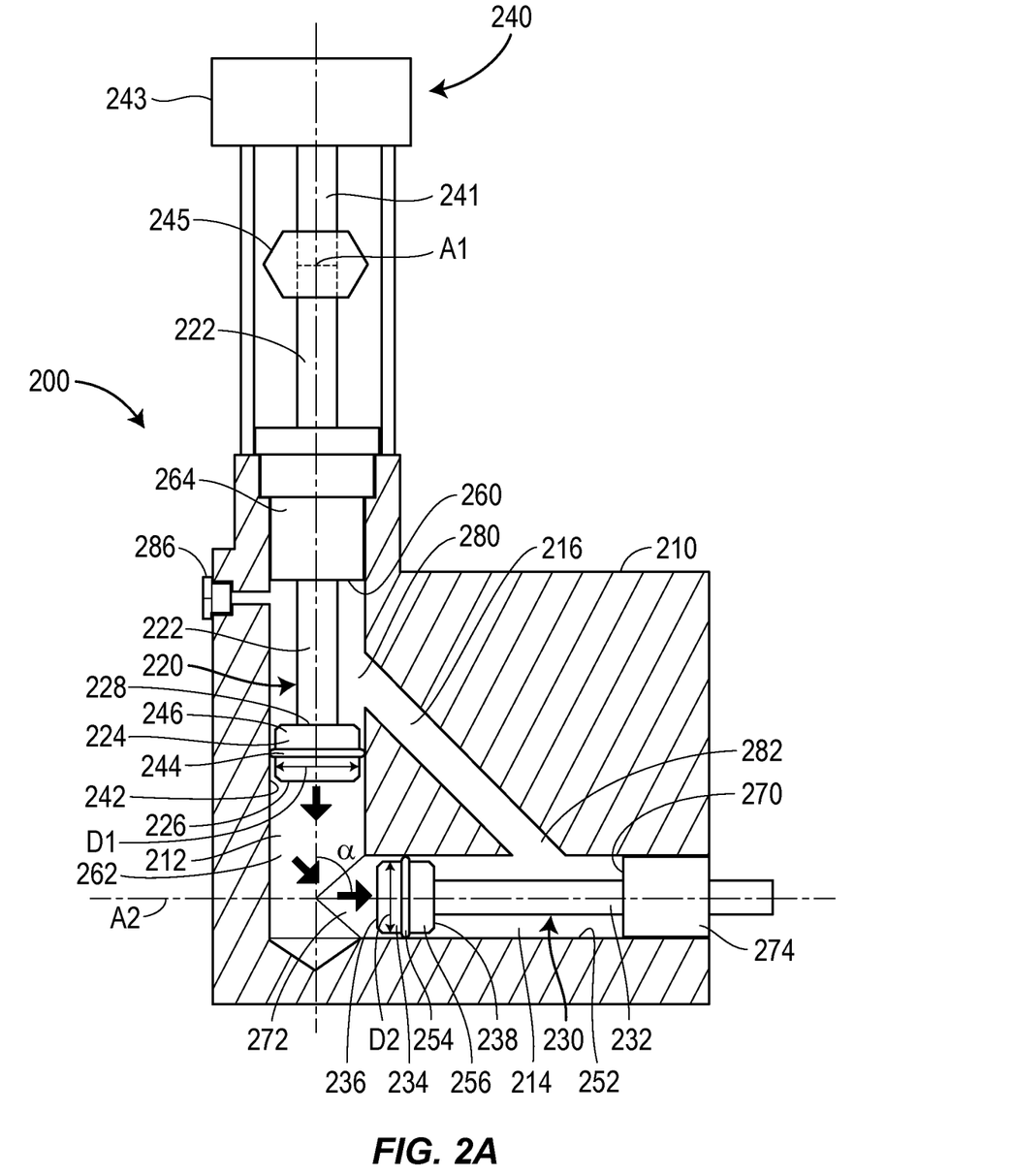
FIG. 2A illustrates a motion conversion device 200 during a ram down operation.
Figure 2B:
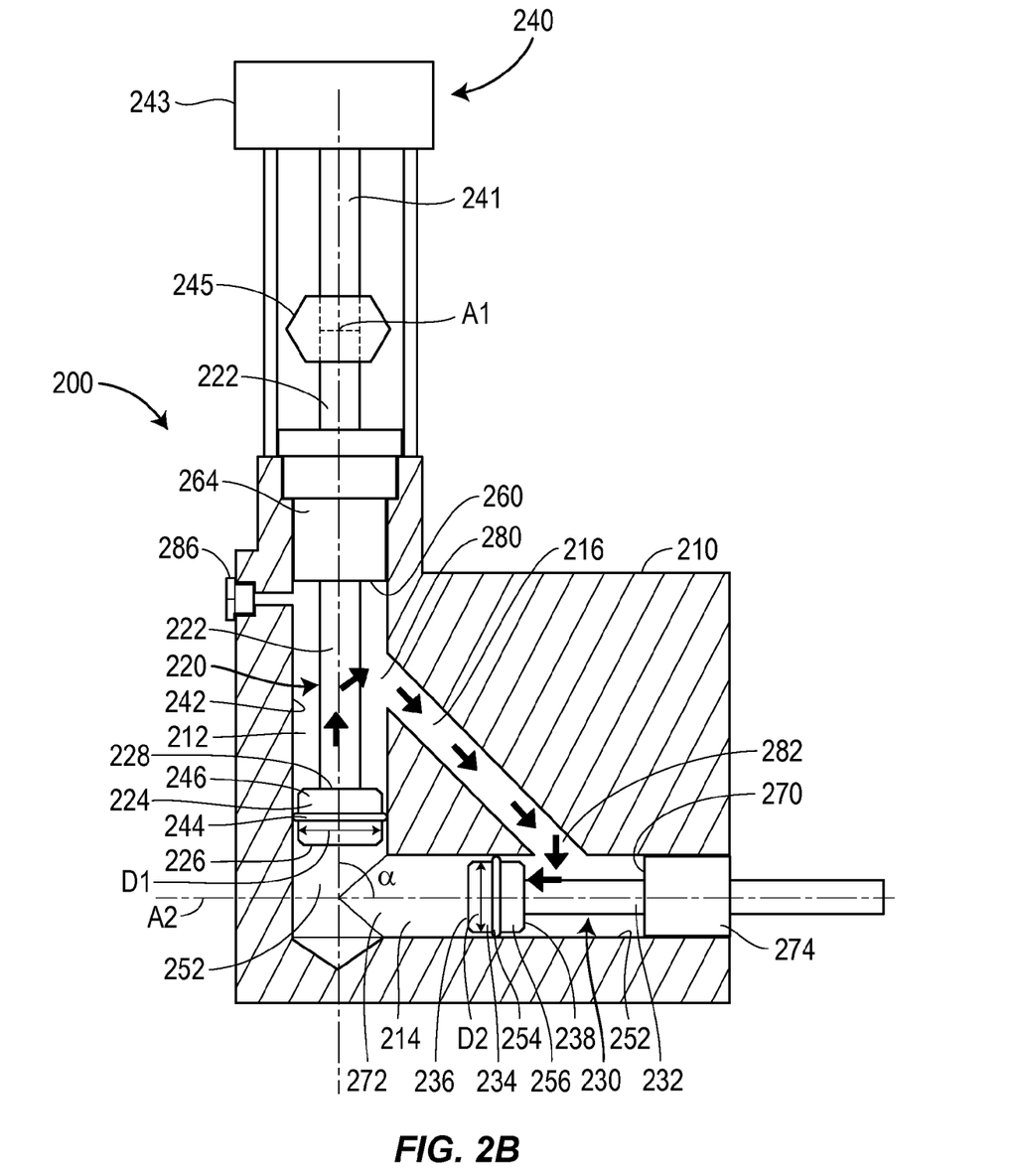
FIG. 2B shows the motion conversion 200 device during a ram up operation.

Referring now to the drawings, FIGS. 2A and 2B depict a motion conversion device 200 according to an exemplary embodiment. The motion conversion device 200 converts translational movement along a first axis A1 into translational movement along a second axis A2. The motion conversion device 200 includes a body 210 with a first bore 212, a second bore 214 and a third bore 216. The bores 212, 214 and 216 are in fluid communication with each other and form a closed circuit. A first double-acting cylinder 220 is positioned in the first bore 212 and a second double-acting cylinder 230 is positioned in the second bore 214. The first double-acting cylinder 220 moves along the first axis A1, and the second double-acting cylinder 230 moves along the second axis A2. The first double-acting cylinder 220 is driven along the first axis A1 by an actuator 240. A liquid (e.g., a hydraulic liquid) or gas fills the first, second and third bores 212, 214 and 216. The first double-acting cylinder 220 acts as a ram that pushes the liquid or gas against the second double-acting cylinder 230 and thereby causes the second double-acting cylinder 230 to move along the second axis A2.

The first double-acting cylinder 220 includes a first rod 222 aligned along the first axis A1 and a first piston 224. The first rod 222 and the first piston 224 may be formed in one piece or formed as separate components attached a threaded connection, for example. The first piston 224 may be cylindrically-shaped and possess a diameter of D1. The piston 224 possesses first and second end surfaces 226, 228 facing in opposite directions. The first end surface 226 pushes the liquid or gas in the first bore 212 when the first double-acting cylinder 220 is driven by the linear actuator 240 in the downward direction as shown in FIG. 2A. The second end surface 228 of the first piston 224 pushes the liquid or gas in the first bore 212 when the first double-acting cylinder 220 is driven by the linear actuator 240 in the upward direction as shown in FIG. 2B. The cylinder 220 is a double-acting cylinder because the cylinder 220 employs the first and second end surfaces 226, 228 to push the liquid or gas in the first bore 212 in opposite directions.

The first piston 224 sealingly and slidably engages a circumferential surface 242 of the first bore 212. This is accomplished by, for example, an O-ring 244 wrapped around a circumferential surface 246 of the first piston 224. The circumferential surface 246 may include an annular groove for holding the O-ring 244. In one embodiment, the first piston 224 includes multiple O-rings 244 positioned in multiple, respective annular grooves. The O-ring 244 inhibits the passage of liquid or gas around the first piston 224. This enables the first piston 224 to create a positive pressure on one side of the first piston 224 and a negative pressure on the other side of the first piston 224, and vice versa.

The second double-acting cylinder 230 in a similar manner as the first double-acting cylinder 220. The second double-acting cylinder 230 includes a first rod 232 aligned along the second axis A2 and a second piston 234. The first rod 232 and the second piston 234 may be attached, for example, by a threaded connection or they can be formed in one piece as a unitary structure. The second piston 234 may possess a cylindrical shape and have a diameter of D2. Opposite ends of the second piston 234 include first and second end surfaces 236, 238. The first end surface 236 is pushed by the liquid or gas in the second bore 214 when the first double-acting cylinder 230 is driven in the downward direction as shown in FIG. 2A. The second end surface 238 is pushed by the liquid or gas in the second bore 214 when the first double-acting cylinder 230 is driven in the upward direction in the manner shown in FIG. 2B. The first double-acting cylinder 230 is a double-acting cylinder because the first and second end surfaces 236, 238 allow the first double-acting cylinder 230 to be pushed in opposite directions.

The second piston 234 sealingly and slidably engages a circumferential surface 252 of the second bore 214. An O-ring 254 may be provided to sealingly and slidably engage the second piston 234 and the circumferential surface 252 of the second bore 214. The O-ring 254 may be positioned in an annular groove in a circumferential surface 256 of the second piston 234. In one embodiment, the second piston 234 includes multiple annular grooves, each holding a respective O-ring 254. The O-ring inhibits the passage of liquid or gas around the second piston 234, and thereby allows a pressure differential to exist across the second piston 234.

The first, second and third bores 212, 214, 216 illustrated in FIGS. 2A and 2B are machined from or cast into a block of material (i.e., the body 210). In one embodiment, the bores 212, 214, 216 are formed in separate components. The first bore 212 includes a closed end 260 and an open end 262. The closed end 260 may be formed by a portion of the body 210 or by a plug 264 positioned in the end of the first bore 212 as illustrated in FIGS. 2A and 2B. The first rod 222 of the first double-acting cylinder 220 extends through a hole in the closed end 260 of the first bore 212. An O-ring or other sealing device (not shown) may be provided to seal the first rod 222 and the hole in the closed end 260. The open end 262 of the first bore 212 fluidly couples the first bore 212 with the second bore 214. The open end 262 first bore 212 may open directly into the second bore 214 as depicted in FIGS. 2A and 2B, or may be connected by a fluid passage to the second bore 212.

The second bore 214 includes a closed end 270 and an open end 272. A portion of the body 210 may form the closed end 270 of the second bore 214, or a plug 274 positioned in the second bore 214 may form the closed end 270 in the manner shown in FIGS. 2A and 2B. The second rod 232 of the second double acting cylinder 230 extends through a hole in the closed end 270 of the second bore 214. The second rod 232 may sealingly engage the closed end 270 by way of an O-ring or other sealing device (not shown). The open end 262 of the second bore 214 fluidly couples the second bore 214 with the first bore 212. The open end 272 may open directly into the first bore 212 as depicted in FIGS. 2A and 2B, or may be connected by a liquid passage (not shown) to first bore 212.

The third bore 216 includes a first open end 280 in fluid communication with the first bore 212, and a second open end 282 in fluid communication with the second bore 214. FIGS. 2A and 2B show that the first and second open ends 280, 282 open directly into the first and second bores 212, 214, respectively. In one embodiment, the first and second open ends 280, 282 may be connected via respective liquid passages to the first and second bores 212, 214. The third bore 216 fluidly couples a portion of the first bore 212 bounded by the closed end 260 and the first piston 224 and a portion of the second bore 214 bounded by the closed end 270 and the second piston 234.

The first bore 212 extends along the first axis A1 and guides the first double-acting cylinder 220 along the first axis A1. The second bore 214 extends along the second axis A2 and thus guides the second double-acting cylinder 230 along the second axis A2. The first and second axes A1 and A2 form an angle α. The first and second axes A1 and A2 illustrated in FIGS. 2A and 2B are orthogonal to each other so that the angle α is equal to approximately (e.g., ±10%) 90 degrees. The angle α can be any angle between 0-180 degrees. The first and second double-acting pistons 220, 230 operate in substantially the same way regardless of the angle α. Accordingly, the motion conversion device 200 can be implemented in a variety of different applications having different dimensional constraints.

A bleed valve 286 is provided to vent pressure from the first, second and/or third bores 212, 214, 216. The bleed valve 286 may provide a means to vent contaminant gas trapped in the first, second and/or third bores 212, 214, 216. Although FIGS. 2A and 2B illustrate a single bleed valve 286 attached to the first bore 212, multiple bleed valves may be provided to vent various portions of the bores 212, 214, 216.

The linear actuator 240 provides the force necessary to move the first double-acting cylinder 220 back-and-forth along the first axis A1. The linear actuator 240 includes an actuator stem 241 that is removably coupled to the first rod 222 by a connector 245 (e.g., a nut). The linear actuator 240 may include a motorized device such as an electric motor. A programmable controller may be connected to the electric motor to control the output of the linear actuator 240, and thereby control the position of the first double-acting cylinder 220. In one embodiment, the linear actuator 240 is a handle manually operable by a user. The linear actuator 240 may be partially (or entirely) positioned within the first bore 212 or the linear actuator 240 may be exterior to the first bore 212 as illustrated in FIGS. 2A and 2B.

In one embodiment, the linear actuator 240 may be a spring-and-diaphragm actuator, in which a force of a hydraulic pressure inside a casing 243 pushes against a diaphragm (not shown) to oppose a biasing force provided by a spring (not shown). The linear actuator 240 may be a direct acting actuator such that the actuator stem 241 extends toward the body 210 as the hydraulic pressure on the diaphragm increases. Alternatively, the linear actuator 240 may be a reverse acting actuator such that the actuator stem 241 retracts way from the body 210 as the hydraulic pressure on the diaphragm increases. In another embodiment, the linear actuator 240 may be a double-acting piston actuator which supplies separate hydraulic pressures to either side of an actuator piston (not shown) inside the casing 243 to create a pressure differential that selectively moves the actuator stem 241 toward and away from the body 210.

The embodiment of the motion conversion device 200 illustrated in FIGS. 2A and 2B is configured so that the travel distance of the first double-acting cylinder 220 is generally equal to the travel distance of the second double-acting cylinder 230. Accordingly, the ratio of movement between the first and second double-acting cylinders 220, 230 is approximately (e.g., ±10%) 1:1. This movement ratio is a result of the first diameter D1 of the first piston 224 being the same, or substantially the same, as the second diameter D2 of the second piston 226. Other ratios of movement can be achieved by changing the relative sizes of the first and second diameters D1, D2. The first diameter D1 can be made larger than the second diameter D2 so that the distance traveled by the second double-acting cylinder 230 is greater than the distance traveled by the first double-acting cylinder 220. Alternatively, the first diameter D1 can be made smaller than the second diameter D2 so that the distance traveled by the second double-acting cylinder 230 is less than the distance traveled by the first double-acting cylinder 220. In one embodiment, a regulator (not shown) may be provided to regulate different volumes of the fluid.

The liquid or gas filling the bores 212, 214, 216 can be any liquid or gas, and can be a liquid or gas commonly utilized in the cylinder arts. For example, the liquid may be a hydraulic liquid such as oil. The liquid may be incompressible to help ensure that little or no motion is lost between the first double-acting cylinder 220 and the second double-acting cylinder 230. If the bores are to be filled with gas, nitrogen may be used.

The following describes the operation of the motion conversion device 200. FIG. 2A illustrates the motion conversion cylinder 200 during a ram down operation. Here, the actuator 240 moves the first double-acting cylinder 220 along the first axis A1 in the downward direction. The first end surface 226 of the first piston 224 pushes the liquid or gas in the first bore 212 into the second bore 214. This in turn causes the liquid or gas in the second bore 214 to push against the first end surface 236 of the second piston 234. The shaded arrows in FIG. 2A represent the movement of the liquid or gas during the ram down operation. The liquid or gas exerts pressure against the first end surface 236 of the second piston 234 and thus causes the second double-acting cylinder 230 to move to the right in FIG. 2A along the second axis A2.

FIG. 2B illustrates the motion conversion device during a ram up operation. Here, the actuator 240 moves the first double acting cylinder 220 along the first axis A1 in the upward direction. The second end surface 228 of the first piston 224 pushes liquid or gas in the first bore 212 into the third bore 216. As a result, the liquid or gas in the third bore 216 is displaced into the second bore 214. This in turn pushes the liquid or gas in the second bore 214 into the second end surface 238 of the second piston 234. The shaded arrows in FIG. 2B represent the movement of the liquid or gas during the ram up operation. The liquid or gas exerts pressure against the second end surface 238 of the second piston 234 and thus causes the second double-acting cylinder 230 to move leftwards in FIG. 2B along the second axis A2.

In the ram down operation and the ram up operation, the first double-acting cylinder 230 hydraulically or pneumatically pushes the second double-acting cylinder 240 along the second axis A2. The liquid or gas in the bores 212, 214, 216 converts the movement of the first double-acting cylinder 220 along the first axis A1 into movement of the second double-acting cylinder 230 along the second axis A2. The distance traveled by the first piston 224 is approximately (e.g., ±10%) equal to the distance traveled by the second piston 234, resulting in a 1:1 movement ratio. Other movement ratios (e.g., 1:2 or 2:1 ratio) can be implemented by making the diameters of the first and second pistons 224, 234 different.

Figure 3:
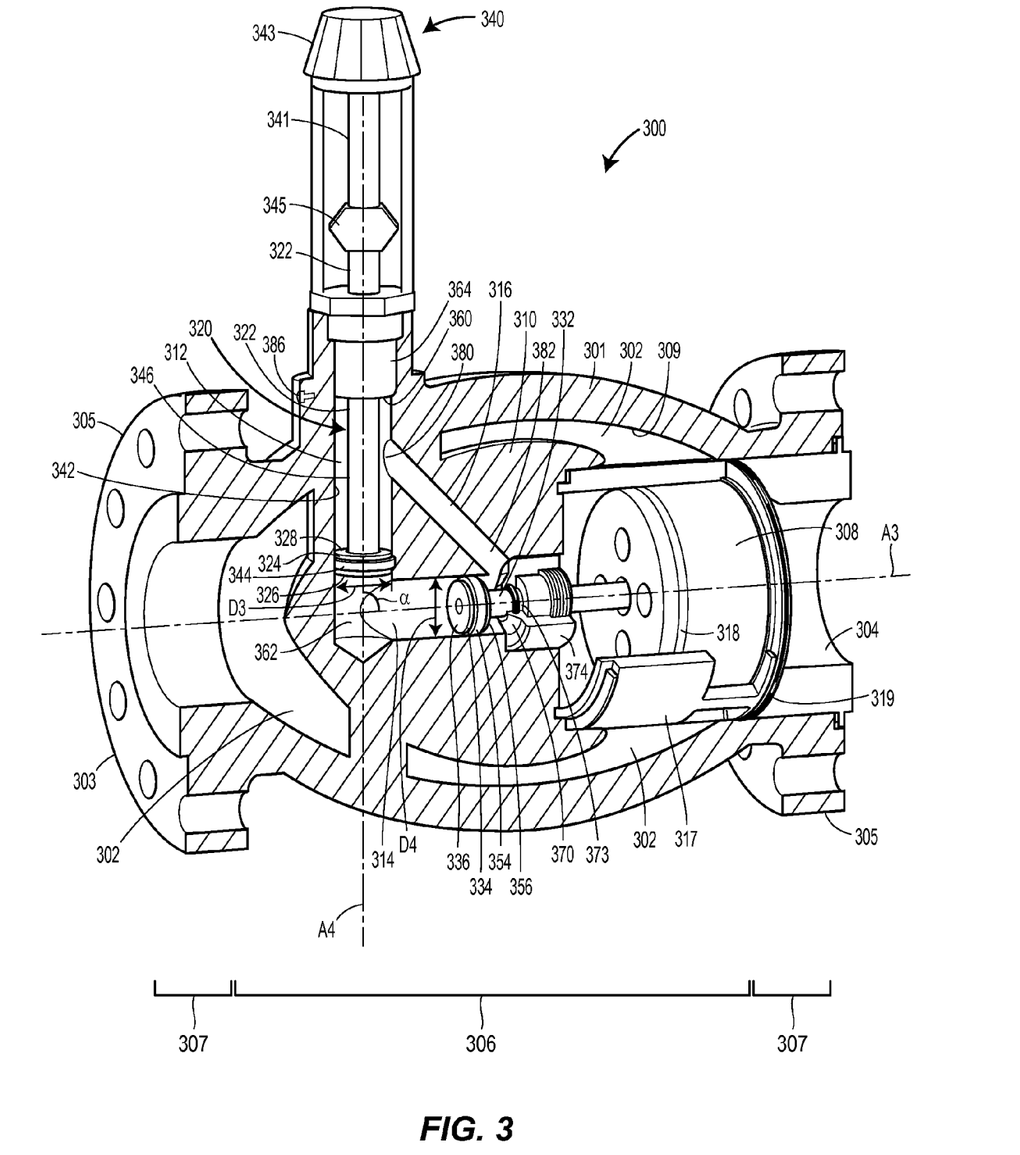
FIG. 3 is a cutaway view of an axial flow valve 300 incorporating two double-acting cylinders 320, 330 for opening and closing the axial flow valve 300.

The above-described motion conversion device can be implemented in a variety of different applications including, but not limited to, an axial flow valve. Axial flow valves are commonly employed in industrial applications such as oil and natural gas pipelines, chemical pipelines, water pipelines, etc. FIG. 3 illustrates a cutaway view of an axial flow valve 300 incorporating a motion conversion device similar to that described above. The axial flow valve 300 includes a valve body 301 having a flow passage 302 extending along a longitudinal axis A3 between an inlet 303 and an outlet 304. The ends of the valve body 302 may include connectors 305 for securing the axial flow valve 300 to a pipeline (not shown). The flow passage 302 includes a large diameter portion 306 and a small diameter portion 307. A closure member or plug 308 is positioned in the large diameter portion 306 of the flow passage 302. The closure member 308 is movable along the longitudinal axis A3 between a closed position and an open position. In the closed position (FIG. 3), the closure member 308 sealingly engages an interior surface 309 of the valve body 301 surrounding the flow passage 302, and thereby obstructs the flow of fluid through the axial flow valve 300. In the open position (not shown), the closure member 308 is retracted along the longitudinal axis A3 so that the closure member 308 no longer contacts the interior surface 309 of the valve body 301. This allows fluid to flow freely through the flow passage 302.

An actuator 340 provides the power for moving the closure member 306 along the longitudinal axis A3. The actuator 340 is exterior to the flow passage 302 and generates translational movement along an axis A4 which is angled relative to the longitudinal axis A3. To convert the movement along axis A4 into movement along longitudinal axis A3, a motion conversion device is provided. The motion conversion device includes a housing 310 that encloses a first bore 312, a second bore 314 and a third bore 316. The housing 310 is positioned in the large diameter portion 305 of the flow passage 302. The fluid in the flow passage 302 flows around the housing 310 when passing through the large diameter portion 306 of the flow passage 302. The exterior surface of the housing 310 is shaped to reduce flow resistance. For example, the housing 310 may possess the shape of a prolate spheroid (i.e., a football shape) with a tip of the prolate spheroid pointing toward the inlet 303 of the axial flow valve 300.

The housing 310 includes a hollow cylindrical extension 317 extending along the longitudinal axis A3 toward the outlet 304. The hollow cylindrical extension 317 houses the closure member 308, which may also possess a cylindrical shape. An O-ring 318 is wrapped around the closure member 308 to sealingly and slidably engage the closure member 308 and an interior surface of the hollow cylindrical extension 317. Another O-ring 319 may be wrapped around the closure member 308 adjacent the end of the closure member 308 facing the outlet 304 to create a seal between the closure member 308 and the interior surface 309 of the valve body 301 when the closure member 308 is arranged in the closed position.

The first, second and third bores 312, 314 and 316 form a closed circuit within the housing 310. A first double-acting cylinder 320 is positioned in the first bore 312 and a second double-acting cylinder 330 is positioned in the second bore 314. The first double-acting cylinder 320 moves along the axis A4, and the second double-acting cylinder 330 moves along the longitudinal axis A3. The second double-acting cylinder 330 and the second bore 314 are coaxial with the longitudinal axis A3 of the flow passage 302. In some embodiments, the second double-acting cylinder 330 moves along an axis offset from the longitudinal axis A3.

The first double-acting cylinder 320 is driven along the axis A4 by the actuator 340. A hydraulic liquid or gas, different from the fluid flowing through the flow passage 302, fills the first, second and third bores 312, 314, 316. The first double-acting cylinder 320 acts as a ram that pushes the hydraulic liquid or gas against the second double-acting cylinder 330. This causes the second double-acting cylinder 330 to move along the longitudinal axis A3. The second double-acting cylinder 330 is connected to the closure member 308 such that movement of the second double-acting cylinder 330 results in movement of the closure member 308.

The first double-acting cylinder 320 includes a first rod 322 aligned along the axis A4 and a first piston 324. The first rod 322 and the first piston 324 may be formed in one piece or formed as separate components attached by a threaded connection, for example. The first piston 324 may be shaped as a cylinder and possess a diameter of D3. The first piston 324 possesses first and second end surfaces 326, 328 facing in opposite directions. The first end surface 326 pushes the hydraulic liquid or gas in the first bore 312 when the first double-acting cylinder 320 is driven by the actuator 340 in the downward direction in FIG. 3. The second end surface 328 of the first head 324 pushes the hydraulic liquid or gas in the first bore 312 when the actuator 340 drives the first double-acting cylinder 320 in the upward direction in FIG. 3. The cylinder 320 is a double-acting cylinder because the cylinder 320 employs the first and second end surfaces 326, 328 to push the hydraulic liquid or gas in the first bore 312 in opposite directions.

The first piston 324 sealingly and slidably engages a circumferential surface 342 of the first bore 312. This is accomplished by, for example, an O-ring 344 wrapped around a circumferential surface 346 of the first piston 224. The circumferential surface 346 may include an annular groove for holding the O-ring 344. In one embodiment, the first piston 324 includes multiple O-rings 344 positioned in multiple, respective annular grooves. The O-ring 344 inhibits the passage of liquid or gas around the first piston 324. This enables the first piston 324 to create a positive pressure on one side of the first piston 324 and a negative pressure on the other side of the first piston 324, and vice versa.

The second double-acting cylinder 330 possesses a similar arrangement as the first double-acting cylinder 320. The second double-acting cylinder 330 includes a first rod 332 aligned along the longitudinal axis A3 and a second piston 334. The first rod 332 and the second piston 334 may be attached, for example, by a threaded connection or they can be formed in one piece as a unitary structure. The second piston 334 may possess a cylindrical shape and have a diameter of D4. Opposite ends of the second head 334 include first and second end surfaces 336, 338. The first end surface 336 is pushed by the liquid or gas in the second bore 314 when the first double-acting cylinder 320 is driven in the downward direction in FIG. 3. The second end surface 338 is pushed by the liquid or gas in the second bore 314 when the first double-acting cylinder 320 is driven in the upward direction in FIG. 3. The cylinder 330 is a double-acting cylinder because the first and second end surfaces 336, 338 allow the cylinder 330 to be pushed in opposite directions.

The second piston 334 sealingly and slidably engages a circumferential surface 352 of the second bore 314. An O-ring 354 may be provided to sealingly and slidably engage the second piston 334 and the circumferential surface 352 of the second bore 314. The O-ring 354 may be positioned in an annular groove in a circumferential surface 356 of the second piston 334. In one embodiment, the second piston 334 includes multiple annular grooves, each holding a respective O-ring 254. The O-ring inhibits the passage of the hydraulic liquid or gas around the second piston 334, and thereby permits a pressure differential to exist across the second piston 334.

The housing 310 and the valve body 301 illustrated in FIG. 3 are formed in one piece as a unitary structure. The housing 310 and the valve body 301 may also be formed as separate, removably connected components. The housing 310 may not be a single block of material as shown in FIG. 3. The housing 310 may include several removably connected elements, with each element housing one of the bores 312, 314 and 316.

The first bore 312 includes a closed end 360 and an open end 362. The closed end 360 may be formed by a portion of the body 310 or by a plug 364 positioned in the end of the first bore 312. The first rod 322 of the first double-acting cylinder 320 extends through a hole in the closed end 320 of the first bore 312. An O-ring (not shown) may be provided to seal the first rod 322 and the hole in the closed end 360. The open end 362 of the first bore 312 fluidly couples the first bore 312 with the second bore 314. The open end 362 of the first bore 312 may open directly into the second bore 314 as depicted in FIG. 3, or may be connected by a fluid passage to the second bore 312.

The second bore 314 includes a closed end 370 and an open end 372. A portion of the body 310 may form the closed end 370 of the second bore 314, or a plug 374 positioned in the second bore 314 may form the closed end 370 as shown in FIG. 3. The second rod 332 of the second double acting cylinder 330 extends through a hole in the closed end 370 of the second bore 314 and attaches to the closure member 308. The second stem 332 may be removably attached to the closure member 308. The second rod 323 may sealingly engage the closed end 370 by way of an O-ring 373. The open end 362 of the second bore 314 liquidly couples the second bore 314 with the first bore 312. The open end 372 of the second bore 314 may open directly into the first bore 312 as FIG. 3, or may be connected by a liquid passage (not shown) to first bore 312.

The third bore 316 includes a first open end 380 in fluid communication with the first bore 312, and a second open end 382 in fluid communication with the second bore 314. FIG. 3 shows that the first and second open ends 380, 382 open directly into the first bore 312 and the second bore 314, respectively. In one embodiment, the first and second open ends 380, 382 may be connected via respective liquid passages to the first and second bores 312, 314. The third bore 316 liquidly couples a portion of the first bore 312 bounded by the closed end 360 and the first piston 324 and a portion of the second bore 314 bounded by the closed end 370 and the second piston 334.

The axes A3 and A4 illustrated in FIG. 3 are orthogonal to each other so that the angle α is equal to approximately (e.g., ±10%) 90 degrees. The angle α, however, can be any angle between 0-180 degrees. The first and second double-acting cylinders 320, 330 operate in substantially the same way regardless of the angle α.

A bleed valve 386 is provided to vent pressure from the first, second and/or third bores 312, 314, 316. The bleed valve 386 may provide a means to vent contaminant gas trapped in the first, second and/or third bores 312, 314, 316. FIG. 3 illustrates a single bleed valve 386 attached to the first bore 312, but other bleed valves may also be provided to vent bores 314, 316.

The linear actuator 340 provides the force necessary to move the first double-acting cylinder 320 back-and-forth along the first axis A4. The linear actuator 340 may include an actuator stem 341 that is removably coupled to the first rod 322 by a connector 345 (e.g., a nut). The linear actuator 340 may include a motorized device such as an electric motor. A programmable controller may be connected to the electric motor to control the output of the linear actuator 340, and thereby control the position of the first double-acting cylinder 320. In one embodiment, the linear actuator 340 is a handle manually operable by a user. For example, the linear actuator 340 could be a wheel that can be rotated by the user. The linear actuator 340 may be partially (or entirely) housed within the first bore 312, or the actuator 340 may be outside the first bore 312 as illustrated in FIG. 3.

In one embodiment, the linear actuator 340 may be a spring-and-diaphragm actuator, in which a force of a hydraulic pressure inside a casing 343 pushes against a diaphragm (not shown) to oppose a biasing force provided by a spring (not shown). The linear actuator 340 may be a direct acting actuator such that the actuator stem 341 extends toward the body 310 as the hydraulic pressure on the diaphragm increases. Alternatively, the linear actuator 340 may be a reverse acting actuator such that the actuator stem 341 retracts way from the body 310 as the hydraulic pressure on the diaphragm increases. In another embodiment, the linear actuator 340 may be a double-acting piston actuator which supplies separate hydraulic pressures to either side of an actuator piston (not shown) inside the casing 343 to create a pressure differential that selectively moves the actuator stem 341 toward and away from the housing 310.

The embodiment of the motion conversion device illustrated in FIG. 3 is configured so that the travel distance of the first double-acting cylinder 320 is generally equal to the travel distance of the second double-acting cylinder 330. Accordingly, the ratio of movement between the first and second double-acting cylinders 320, 330 is approximately (e.g., ±10%) 1:1. This movement ratio is a result of the diameter D3 of the first piston 324 being the same, or substantially the same, as the diameter D4 of the second piston 326. Other ratios of movement can be implemented by changing the relative sizes of the first and second diameters D3, D4. The diameter D3 can be made larger than the diameter D4 so that the distance traveled by the second double-acting cylinder 330 is greater than the distance traveled by the first double-acting cylinder 320. Alternatively, the diameter D3 can be made smaller than the diameter D4 so that the distance traveled by the second double-acting cylinder 330 is less than the distance traveled by the first double-acting cylinder 320. In one embodiment, a regulator may be provided to regulate different volumes of the fluid.

The hydraulic liquid or gas filling the bores 312, 314, 316 can be any liquid or gas, and can be a liquid or gas commonly utilized in the piston arts. For example, the liquid may be a hydraulic liquid such as oil. The liquid may be incompressible to help ensure that little or no motion is lost between the first double-acting cylinder 320 and the second double-acting cylinder 330. If the bores are to be filled with gas, nitrogen may be used.

Figure 4A:
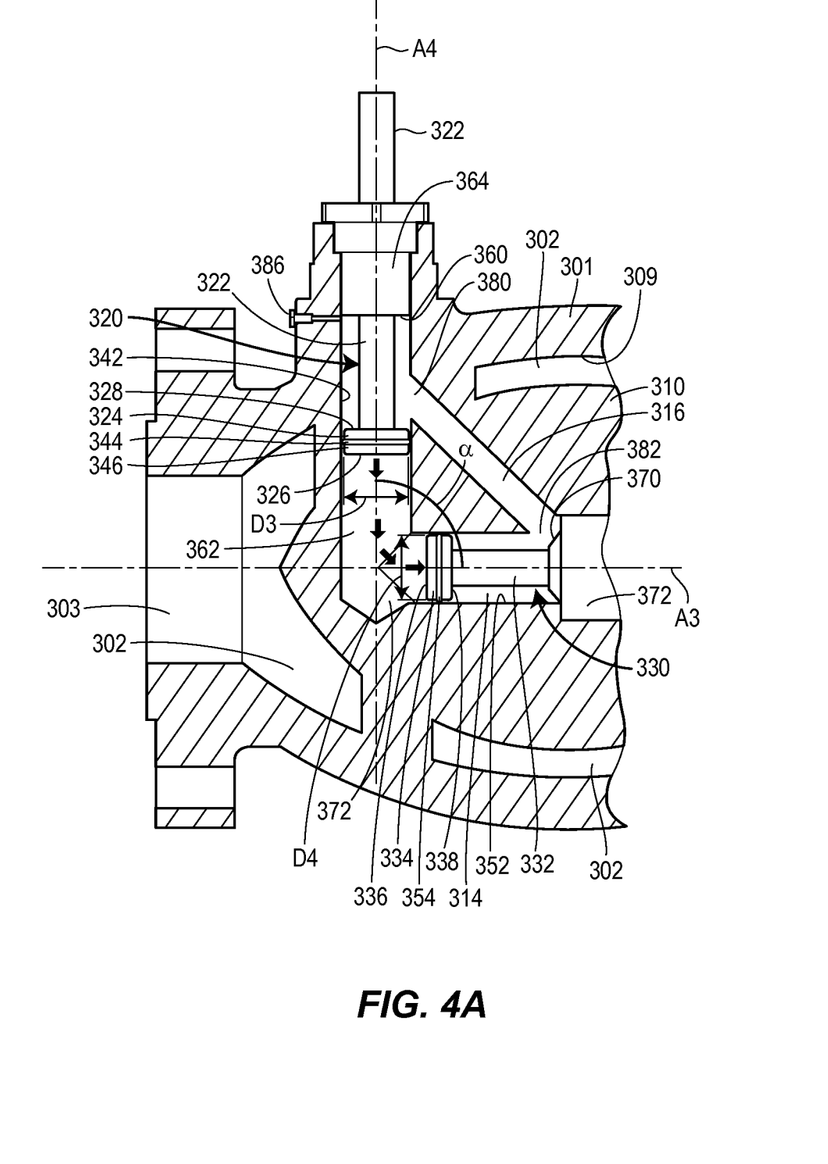
FIG. 4A depicts a cross-sectional view of the axial flow valve 300 of FIG. 3 at the onset of a ram down operation to close the axial flow valve 300.
Figure 4B:
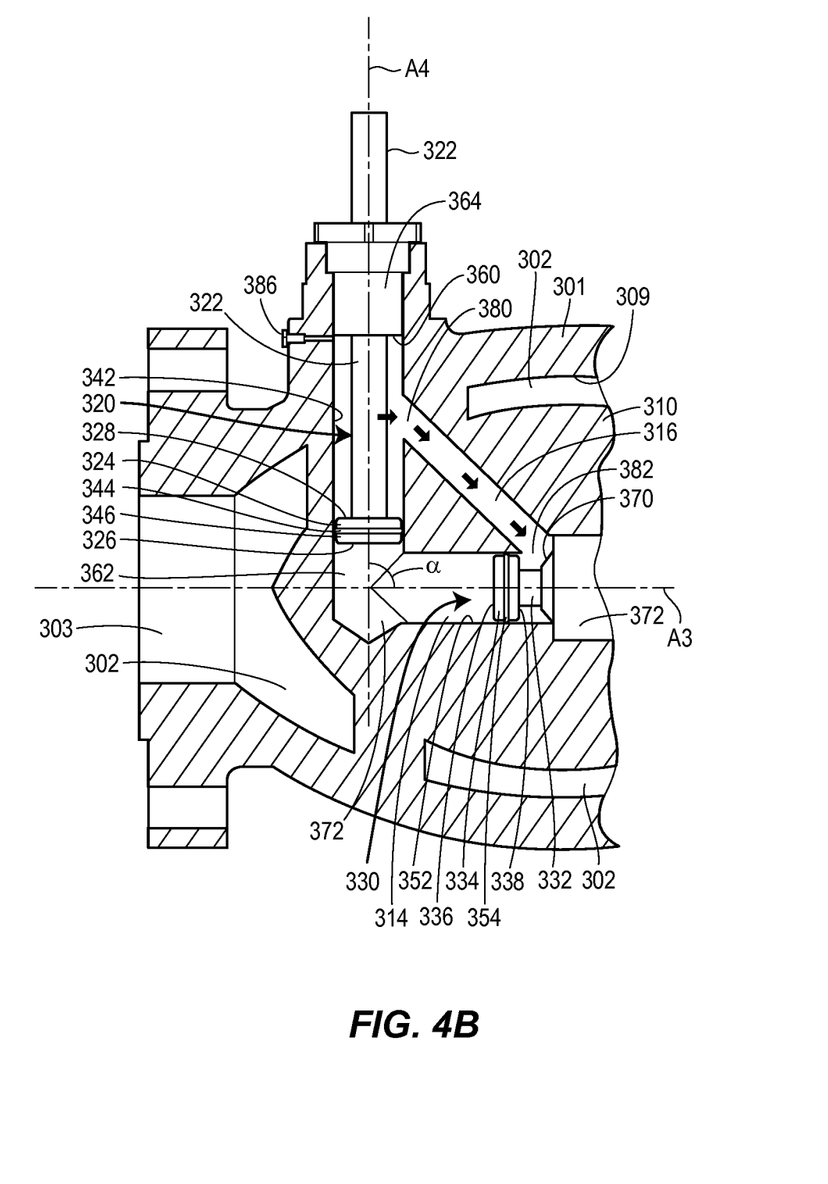
FIG. 4B is a cross-sectional view of the axial flow valve 300 of FIG. 3 at the onset of a ram up operation to open the axial flow valve 300.

The operation of the first and second double-acting cylinders 320, 330 is similar to the operation of the first and second double-acting cylinders 220, 230 described above. The above description regarding the operation of the first and second double-acting cylinders 220, 230 thus applies equally to the operation of the first and second double-acting cylinders 320, 330. FIGS. 4A and 4B illustrate cross-sections of the valve 300 depicted in FIG. 3. The linear actuator 340 is omitted from FIGS. 4A and 4B for the sake of clarity and may be implemented in the same manner as shown and discussed above with reference to FIG. 3. FIG. 4A illustrates a ram down operation of the first double-acting cylinder 320 that corresponds to the ram down operation illustrated in FIG. 2A. The movement of the second double-acting cylinder 330 in FIG. 4A moves the closure member 308 from the open position to the closed position. FIG. 4B illustrates a ram up operation of the first double-acting cylinder 320 similar to the ram up operation illustrated in FIG. 2B. The movement of the second double-acting cylinder 330 in FIG. 4B moves the closure member 308 from the closed position to the open position.

Compared to the housing 155 of the known axial flow valve 100 illustrated in FIG. 1, the housing 310 of the axial flow valve 300 is smaller. This is because the housing 310 does not require an enlarged rear end to accommodate a gear or other mechanism that protrudes toward the valve inlet when the closure member is in the open position. A smaller housing reduces material and manufacturing costs, and also reduces the flow resistance caused by the housing. The double-acting cylinder arrangement of the axial flow valve 300 also does not require meshingly engaging gears, teeth or threads that tend to wear down over time. Accordingly, the axial flow valve 300 may require less maintenance and may have a longer operating life than known axial flow valves.

While the invention has been described in connection with various embodiments, it will be understood that the invention is capable of further modifications. This application is intended to cover any variations, uses or adaptations of the invention following, in general, the principles of the invention, and including such departures from the present disclosure as, within the known and customary practice within the art to which the invention pertains.

What is claimed is:

1. A valve comprising:
    a valve body including a flow passage extending along an axial flow axis;
    a closure member movable along the axial flow axis between a closed position preventing fluid flow through the flow passage and an open position permitting fluid flow through the flow passage;
    a housing positioned within the valve body and arranged to allow fluid to flow around the housing, the housing including a first bore in line with an external linear actuator, a second bore and a linear third bore intersecting the first bore and the second bore thereby forming a closed circuit arranged to receive a fluid;
    a first double-acting cylinder positioned in the first bore and movable along the first axis;
    a linear actuator configured to move the first double-acting cylinder back-and-forth along the first axis;
    a second double-acting cylinder positioned in the second bore movable along the second axis, the second double-acting cylinder operatively connected to the closure member;
    the first and second axes being angled relative to one another;
    the closed fluid circuit arranged such that movement of the first double-acting cylinder along the first axis causes movement of the second double-acting cylinder along the second axis, thereby causing movement of the closure member between the closed position and the open position.

2. The valve of claim 1,
    the first double-acting cylinder including a first rod, the first piston having a first end surface and a second end surface, the first rod extending through a closed end of the first bore, the first piston sealingly and slidably engaging a circumferential surface of the first bore;
    the second double-acting cylinder including a second rod, the second rod extending through a closed end of the second bore and being operably coupled to the closure member, the second piston sealingly and slidably engaging a circumferential surface of the second bore.

3. The valve of claim 2, wherein:
    a first end surface of the first piston is configured to push the fluid through portions of at least the first and second bores to apply a first fluid force against a first end surface of the second piston, thereby moving the second double-acting cylinder in a first direction away from the first bore to move the closure member in the first direction; and
    a second end surface of the first piston is configured to push the fluid through portions of the first, second and third bores to apply a second fluid force against a second end surface of the second piston, thereby moving the second double-acting cylinder in a second direction away toward the first bore to move the closure member in the second direction.

4. The valve of claim 3, wherein a first end of the third bore opens into a portion of the first bore bounded by the first piston and the closed end of the first bore, and a second end of the third bore opens into a portion of the second bore bounded by the second piston and the closed end of the second bore.

5. The valve of claim 2, comprising a first O-ring positioned in a first annular groove in the first piston to sealingly engage the first piston and the circumferential surface of the first bore, and a second O-ring positioned in a second annular groove in the second piston to sealingly engage the second piston and the circumferential surface of the second bore.

6. The valve of claim 1, wherein the second bore is coaxial with the axial flow axis.

7. The valve of claim 1, wherein the first axis is orthogonal to the second axis.

8. A method for opening and closing a valve, comprising:
    providing a valve having a flow passage along an axial flow axis and a closure member;
    providing a housing positioned within the valve body and arranged to allow fluid to flow around the housing, the housing including defining a closed fluid circuit having a first bore in line with an external linear actuator, and a second bore, the first and second bores angled with respect to one another;
    providing a linear third bore to permit fluid communication between the first bore and the second bore, the third bore forming a portion of the closed fluid circuit and extending at an angle relative to the first and second bores
    positioning a first double-acting cylinder in the first bore;
    positioning a second double-acting cylinder positioned in the second bore;
    operatively connecting second double-acting cylinder to the closure member;
    moving the first double-acting cylinder under fluid pressure in one direction along a first axis to push the second double-acting cylinder in a first direction along a second axis, thereby moving the closure member in the first direction along the second axis to a closed position where the closure member prevents fluid flow through the flow passage;
    moving the first double-acting cylinder under fluid pressure in another direction along the first axis to push the second double-acting cylinder in a second direction opposite the first direction, thereby moving the closure member in the second direction along the second axis to an open position where the closure member permits fluid flow through the flow passage; and
    wherein the first and second double-acting cylinders include, respectively, first and second pistons possessing equal diameters such that a ratio of movement between the first piston along the first axis and the second piston along the second axis is 1:1.

9. The valve of claim 1, wherein the first double-acting cylinder and the second double-acting cylinder are the only double-acting cylinders disposed in the housing.

10. The method of claim 8, wherein the first double-acting cylinder and the second double-acting cylinder are the only double-acting cylinders disposed in the housing.

11. The valve of claim 1, wherein the housing includes a hollow cylindrical extension, extending along the axial flow axis and arranged to slidably receive the closure member.

12. The valve of claim 2, wherein the housing includes a hollow cylindrical extension, extending along the axial flow axis and arranged to slidably receive the closure member; and
    wherein the closed end of the second bore is closed by a removable plug, the plug arranged to slidably receive the second rod.

13. The valve of claim 12, wherein the housing defines only a single first bore housing the first double-acting cylinder, only a single second bore housing the second double-acting cylinder, and only a single third bore.

* * * * *

UNITED STATES PATENT AND TRADEMARK OFFICE
CERTIFICATE OF CORRECTION

PATENT NO. : 9,958,085 B2
APPLICATION NO. : 14/546724
DATED : May 1, 2018
INVENTOR(S) : Bradley Steve Tibben et al.

It is certified that error appears in the above-identified patent and that said Letters Patent is hereby corrected as shown below:

On the Title Page

At Column 1, under "Notice", Line 3, "0 days. days." should be -- 0 days.--.

In the Specification

At Column 2, Lines 3-4, "racks 160, 170," should be -- racks 140, 150, --.

At Column 4, Line 38, "200 device" should be -- device 200 --.

At Column 5, Line 38, "first rod 232" should be -- second rod 232 --.

At Column 5, Lines 39-40, "first rod 232" should be -- second rod 232 --.

At Column 5, Line 47, "first double-acting cylinder 230" should be -- first double-acting cylinder 220 --.

At Column 5, Line 50, "first double-acting cylinder 230" should be -- first double-acting cylinder 220 --.

At Column 5, Lines 51-52, "first double-acting cylinder 230" should be -- first double-acting cylinder 220 --.

At Column 5, Lines 53-54, "first double-acting cylinder 230" should be -- first double-acting cylinder 220 --.

At Column 6, Line 17, "second bore 212." should be -- second bore 214. --.

At Column 6, Line 53, "double-acting pistons 220, 230" should be -- double acting cylinders 220, 223 --.

Signed and Sealed this
Seventh Day of April, 2020

Andrei Iancu
*Director of the United States Patent and Trademark Office*

CERTIFICATE OF CORRECTION (continued)
U.S. Pat. No. 9,958,085 B2

At Column 7, Line 22, "retracts way" should be -- retracts away --.

At Column 7, Line 38, "second piston 226." should be -- second piston 234. --.

At Column 8, Line 22, "first double-acting cylinder 230" should be -- first double-acting cylinder 220 --.

At Column 8, Line 44, "valve body 302" should be -- valve body 301 --.

At Column 8, Line 62, "closure member 306" should be -- closure member 308 --.

At Column 10, Line 13, "first rod 332" should be -- second rod 332 --.

At Column 10, Line 15, "first rod 332" should be -- second rod 332 --.

At Column 10, Line 51, "body 310" should be -- body 301 --.

At Column 10, Line 53, "closed end 320" should be -- closed end 360 --.

At Column 10, Line 60, "second bore 312." should be -- second bore 314. --.

At Column 10, Line 62, "body 310" should be -- body 301 --.

At Column 11, Line 1, "second stem 332" should be -- second rod 332 --.

At Column 11, Lines 2-3, "second rod 323" should be -- second rod 332 --.

At Column 11, Line 55, "body 310" should be -- body 301 --.

At Column 11, Line 58, "retracts way from the body 310" should be -- retracts away from the body 301 --.

At Column 12, Lines 6-7, "second piston 326." should be -- second piston 334. --.

In the Claims

At Column 14, Line 23, "bores" should be -- bores; --.